(12) United States Patent
Hsu

(10) Patent No.: US 11,047,168 B2
(45) Date of Patent: Jun. 29, 2021

(54) SHUTTER AND BLADE DRIVING SYSTEM AND TRANSMISSION DEVICE THEREOF AND BLADE ANGLE CONTROL METHOD USED IN THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventor: Wei-Ting Hsu, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 144 days.

(21) Appl. No.: 16/353,478

(22) Filed: Mar. 14, 2019

(65) Prior Publication Data

US 2019/0284870 A1 Sep. 19, 2019

(30) Foreign Application Priority Data

Mar. 16, 2018 (CN) .......................... 201810218967.5

(51) Int. Cl.
| | |
|---|---|
| *E06B 7/092* | (2006.01) |
| *E06B 7/096* | (2006.01) |
| *F16H 1/22* | (2006.01) |
| *F16D 7/02* | (2006.01) |
| *F16H 19/04* | (2006.01) |

(52) U.S. Cl.
CPC .............. *E06B 7/092* (2013.01); *E06B 7/096* (2013.01); *F16D 7/025* (2013.01); *F16H 1/22* (2013.01); *F16H 19/04* (2013.01)

(58) Field of Classification Search
CPC .......... E06B 7/092; E06B 7/096; E06B 7/084; E06B 9/28; E05F 15/619
See application file for complete search history.

(56) References Cited

U.S. PATENT DOCUMENTS

| | | | |
|---|---|---|---|
| 6,568,131 B1 * | 5/2003 | Milano, Jr. ............. | E06B 7/096 49/25 |
| 6,701,669 B1 * | 3/2004 | Yorgason ................ | E06B 7/096 49/82.1 |
| 7,353,636 B1 * | 4/2008 | Anderson ............... | E06B 7/086 49/74.1 |
| 2005/0076569 A1 * | 4/2005 | Griffiths .................. | E06B 7/096 49/82.1 |
| 2007/0266636 A1 * | 11/2007 | Chen ....................... | E06B 7/096 49/82.1 |
| 2008/0000157 A1 * | 1/2008 | Nien ....................... | E06B 7/096 49/82.1 |

(Continued)

FOREIGN PATENT DOCUMENTS

CN 107724918 A 2/2018

*Primary Examiner* — Marcus Menezes
(74) *Attorney, Agent, or Firm* — Innovation Counsel LLP

(57) ABSTRACT

A shutter including a frame, a first blade set, a second blade set, a power source and a blade driving system is provided. The frame has a frame body. The first blade set and the second blade set are disposed on the frame body of the frame. The power source is disposed in the frame body. The blade driving system connects the power source, the first blade set and the second blade set for rotating the first blade set and/or the second blade set to rotate.

11 Claims, 9 Drawing Sheets

(56) References Cited

U.S. PATENT DOCUMENTS

| | | | | |
|---|---|---|---|---|
| 2008/0120910 A1* | 5/2008 | Chen | .................. | E06B 7/096 49/82.1 |
| 2008/0244979 A1* | 10/2008 | Huang | .................. | E06B 7/096 49/82.1 |
| 2013/0118082 A1* | 5/2013 | Colson | .................. | E06B 7/096 49/82.1 |
| 2015/0020452 A1* | 1/2015 | Chen | .................. | E06B 7/09 49/82.1 |
| 2016/0376834 A1* | 12/2016 | Meyerink | .................. | E06B 7/096 49/82.1 |
| 2018/0179808 A1* | 6/2018 | Fraser | .................. | E05F 15/619 |
| 2019/0078377 A1* | 3/2019 | Jao | .................. | E05F 15/619 |
| 2019/0195007 A1* | 6/2019 | Yen | .................. | E06B 7/096 |
| 2019/0252565 A1* | 8/2019 | Lyons | .................. | H01L 31/048 |
| 2019/0284870 A1* | 9/2019 | Hsu | .................. | F16D 7/025 |
| 2020/0199929 A1* | 6/2020 | Tostee | .................. | E05D 15/264 |

\* cited by examiner

SHUTTER AND BLADE DRIVING SYSTEM AND TRANSMISSION DEVICE THEREOF AND BLADE ANGLE CONTROL METHOD USED IN THE SAME

This application claims the benefit of People's Republic of China application Serial No. 201810218967.5, filed Mar. 16, 2018, the subject matter of which is incorporated herein by reference.

BACKGROUND OF THE INVENTION

Field of the Invention

The invention relates in general to a blocker of a building, and more particularly to a shutter and a blade driving system and a transmission device thereof, and a blade angle control method used in the shutter.

Description of the Related Art

Normally, shutters or glass windows can be configured on the window structure of a building to assure a good effect of daylighting and ventilation in public places or private households. When the shutters or the glass windows are opened, outdoor air and indoor air are ventilated.

When the blades of the shutter are driven by a power, the blade angle can be changed, such that the dimension of the opening as well as the light-transmission area and the light-shading area can be adjusted. According to the current design, the blades of the shutter are opened or shut down simultaneously. That is, when the shutter is opened, all blades are turned in parallel to each other. When the user would like to block the sunlight, the user will have to adjust the blades to match the angle of sunlight. However, when the shutter blocks the sunlight, the shutter also blocks the ventilation of air. Therefore, sunlight blocking and air ventilation cannot be properly adjusted at the same time.

SUMMARY OF THE INVENTION

The present disclosure relates to a shutter and a blade driving system and a transmission device thereof, and a blade angle control method used in the shutter. The blades are divided into different groups which can be opened to different angles, therefore the overlapped area of two adjacent blades can be adjusted to have a variety of changes.

According to one embodiment of the invention, a shutter including a frame, a first blade set, a second blade set, a power source and a blade driving system is provided. The frame has a frame body. The first blade set and the second blade set are disposed on the frame body of the frame. The power source is disposed in the frame body. The blade driving system connects the power source, the first blade set and the second blade set for rotating the blade sets.

According to another embodiment of the invention, a blade angle control method used in a shutter is provided. The blade angle control method includes: rotating the first blade set to an angle towards a direction inverse to a zero direction when the angle of the second blade set is not equivalent to the zero angle; rotating the first blade set and the second blade set towards the zero direction; determining whether the angle of the first blade set is equivalent to a zero angle when the angle of the second blade set is equivalent to the zero angle; rotating the first blade set towards the zero direction when the angle of the first blade set is not equivalent to the zero angle.

According to an alternate embodiment of the invention, a blade angle control method used in a shutter is provided. The blade angle control method includes: reading the angle of the first blade set and the second blade set; rotating the first blade set and the second blade set towards the target direction when the angle of the second blade set is not equivalent to a target angle; determining whether the angle of the first blade set is equivalent to a target angle when the angle of the second blade set is equivalent to the target angle; rotating the first blade set towards the target direction when the angle of the first blade set is not equivalent to the target angle.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

According to an embodiment of the invention, a shutter including a frame, a first blade set, a second blade set, a power source and a blade driving system is provided. The first blade set and the second blade set are disposed on a frame body of the frame. The blade driving system connects a power source and is disposed in the frame body of the frame for rotating the first blade set and/or the second blade set.

Figure 1A:
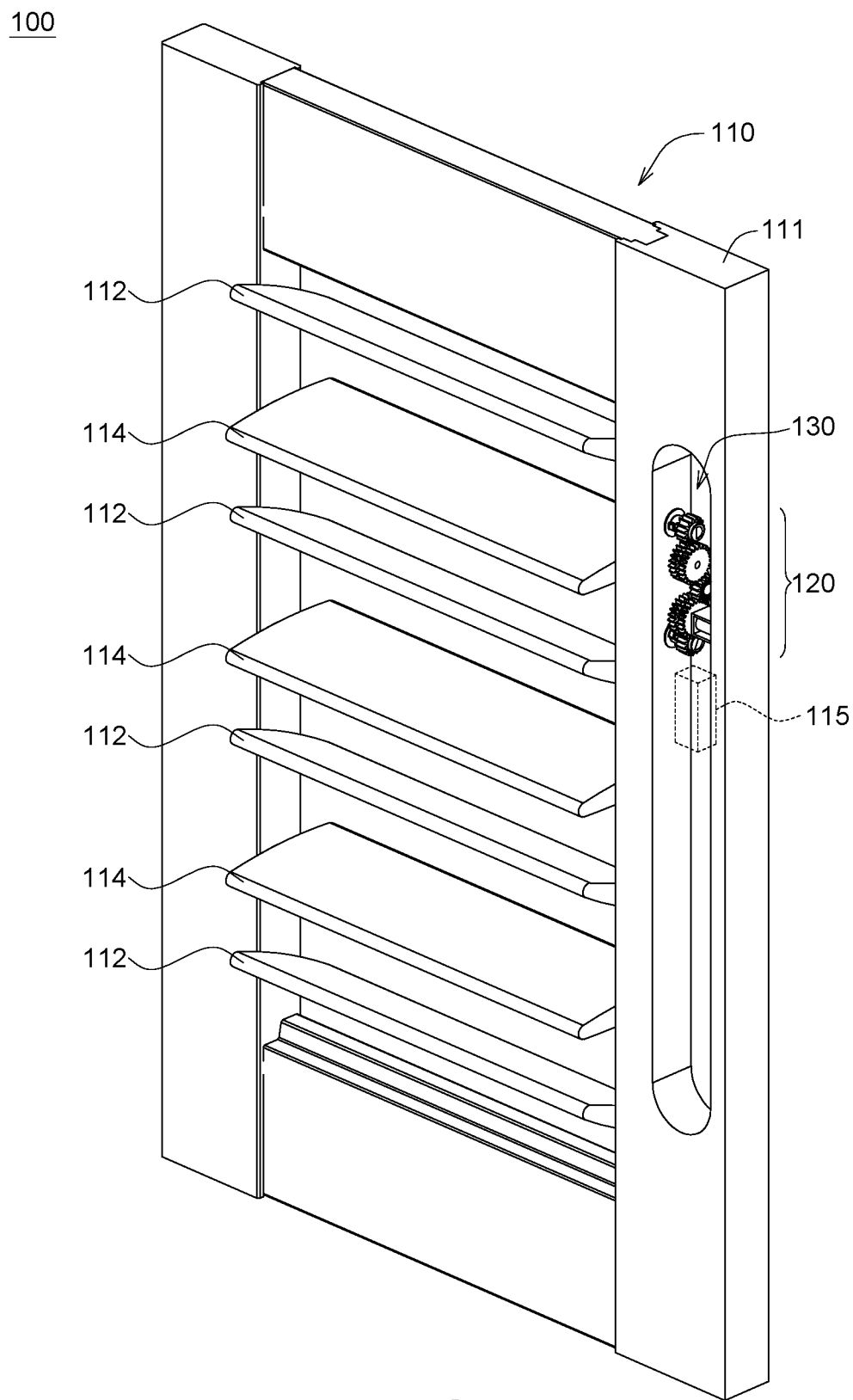
FIG. 1A is an external view of a shutter and a transmission device thereof according to an embodiment of the invention.
Figure 1B:
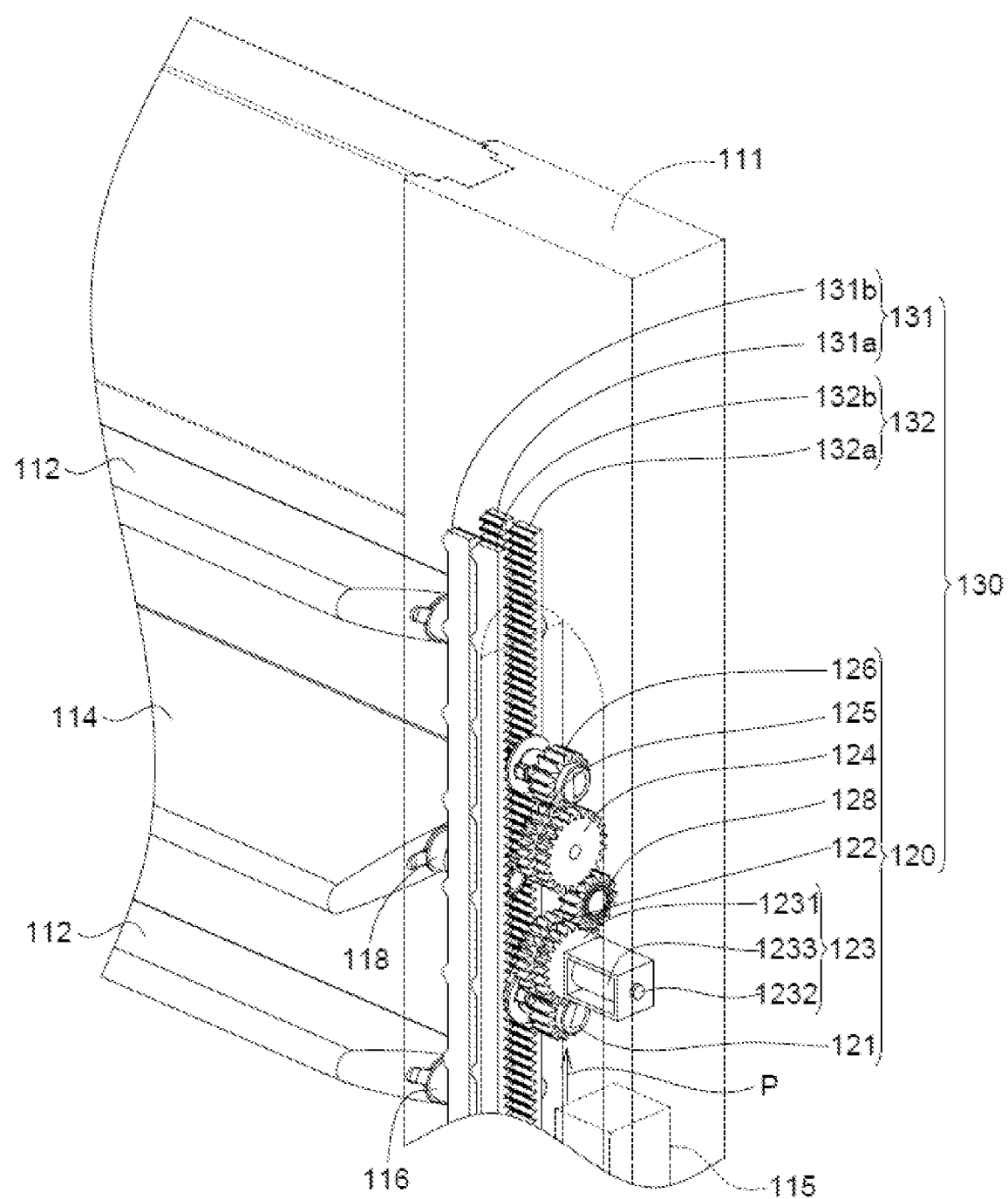
FIG. 1B is a partial enlargement of the blade set, the transmission device and the blade driving system of FIG. 1A.

Refer to FIGS. 1A and 1B. FIG. 1A is an external view of a shutter 100 and a transmission device 120 thereof according to an embodiment of the invention. FIG. 1B is a partial enlargement of the blade sets, the transmission device 120 and the blade driving system 130 of FIG. 1A. In an embodiment, the shutter 100 includes a frame 110, a first blade set 112, a second blade set 114, a power source 115 and a blade driving system 130. The frame 110 is an integrated structure and can be installed in a window structure of a building. The frame body 111 of the frame 110 includes a top frame, a bottom frame, a left frame, and a right frame. In FIG. 1B, for the convenience of description, the right frame of the frame 110 is represented in dotted lines to illustrate the elements disposed therein. The first blade set 112 and the second blade set 114 are disposed on the frame body of the frame 110, that is, between the left frame and the right frame of the frame 110. For example, the first blade set 112 are odd-numbered blades, the second blade set 114 are even-numbered blades. Or, the first blade set 112 are even-numbered blades, and the second blade set 114 are odd-numbered blades. Or, the first blade set 112 and the second blade set 114 are not necessarily even-numbered blades or odd-numbered blades and can be determined according to design needs. The first blade set 112 and the second blade set 114 can be arranged in a staggered manner or a non-staggered manner. When the first blade set 112 and the second blade set 114 are arranged in a staggered manner, one or two second blades can be interposed between two of the first blades, and the first blade set 112 and the second blade set 114 are not limited to a single-blade staggered arrangement. When the first blade set 112 and the second blade set 114 are arranged in a non-staggered manner, the two blade sets are disposed separately. For example, the first blade set 112 is disposed at the top inside of the frame 110, and the second blade set 114 is disposed at the bottom inside of the frame 110.

According to an embodiment of the invention as indicated in FIG. 1B, the power source 115 is for providing a power to the blade driving system 130. The power source 115 is disposed in the frame body 111. The blade driving system 130 connects the power source 115, the first blade set 112 and the second blade set 114. In an embodiment, the blade driving system 130 includes a first rack 131, a second rack 132 and a transmission device 120. The first rack 131 connects the first blade set 112 for rotating the first blade set 112. The second rack 132 connects the second blade set 114 for rotating the second blade set 114. The transmission device 120 connects the first rack 131 and the second rack 132 for driving the first rack and/or the second rack. As indicated in FIG. 1B, the first rack 131 includes two racks 131a and 131b parallel and opposite to each other. Each blade of the first blade set 112 includes a first shaft connection portion 116 having a first latch 1161 (referring to FIG. 2C) engaged between the two racks 131a and 131b of the first rack 131. Therefore, each blade of the first blade set 112, when driven by the first rack 131, can rotate to a predetermined position or a predetermined angle. Besides, the second rack 132 includes two racks 132a and 132b parallel and opposite to each other. Each blade of the second blade set 114 includes a second shaft connection portion 118 having a second latch 1182 (referring to FIG. 2C) engaged between the two racks 132a and 132b of the second rack 132. Therefore, each blade of the second blade set 114, when driven by the second rack 132, can rotate to a predetermined position or a predetermined angle.

In an embodiment, the first rack 131 and the second rack 132 can be driven separately or simultaneously. Separate driving can be implemented by driving the first rack 131 and the second rack 132 using different power sources 115 or switching between the first rack 131 and the second rack 132 and transmitting the power P of one single power source 115 to the selected one of the first rack 131 and the second rack 132. Simultaneous driving can be implemented by coupling the gears by a clutch and simultaneously transmitting the power P to the first rack 131 and the second rack 132. When the gears are not coupled by the clutch, the power P can be separately transmitted to either the first rack 131 or the second rack 132. Operations of the transmission device 120 which transmits the power P through the engagement or disengagement of a clutch are disclosed below.

According to an embodiment of the invention, the transmission device 120 includes a first gear, a second gear, a clutch, a fourth gear, a fifth gear, a friction plate and a sixth gear. The first gear is for receiving a power. The second gear is engaged with the first gear. The clutch includes a third gear disposed adjacent to the second gear. When the second gear is engaged with the third gear, the power is transmitted to the third gear via the second gear. The fourth gear is engaged with the third gear. The fifth gear and the fourth gear are adjacent to each other. The friction plate can be coupled or slipped between the fourth gear and the fifth gear. The sixth gear is engaged with the fifth gear.

Figure 2A:
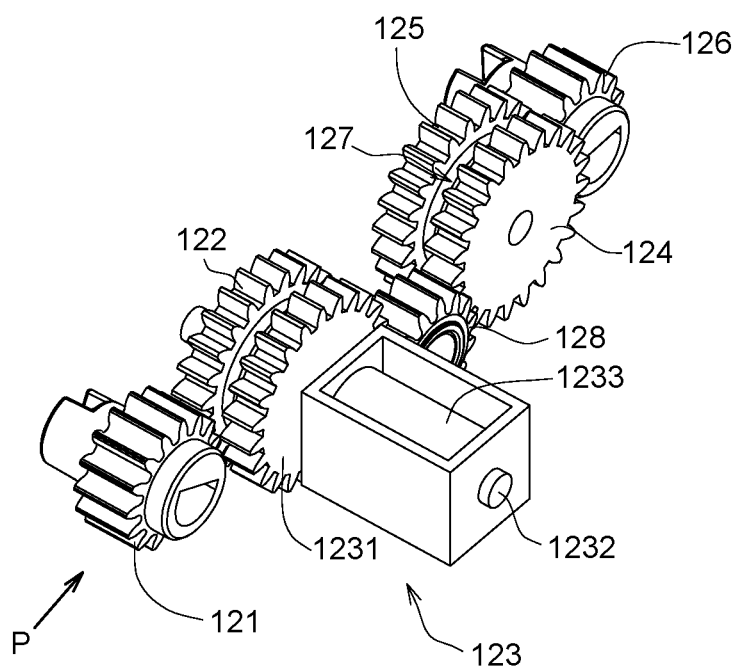
FIG. 2A is a schematic diagram of a transmission device according to an embodiment of the invention.
Figure 2B:
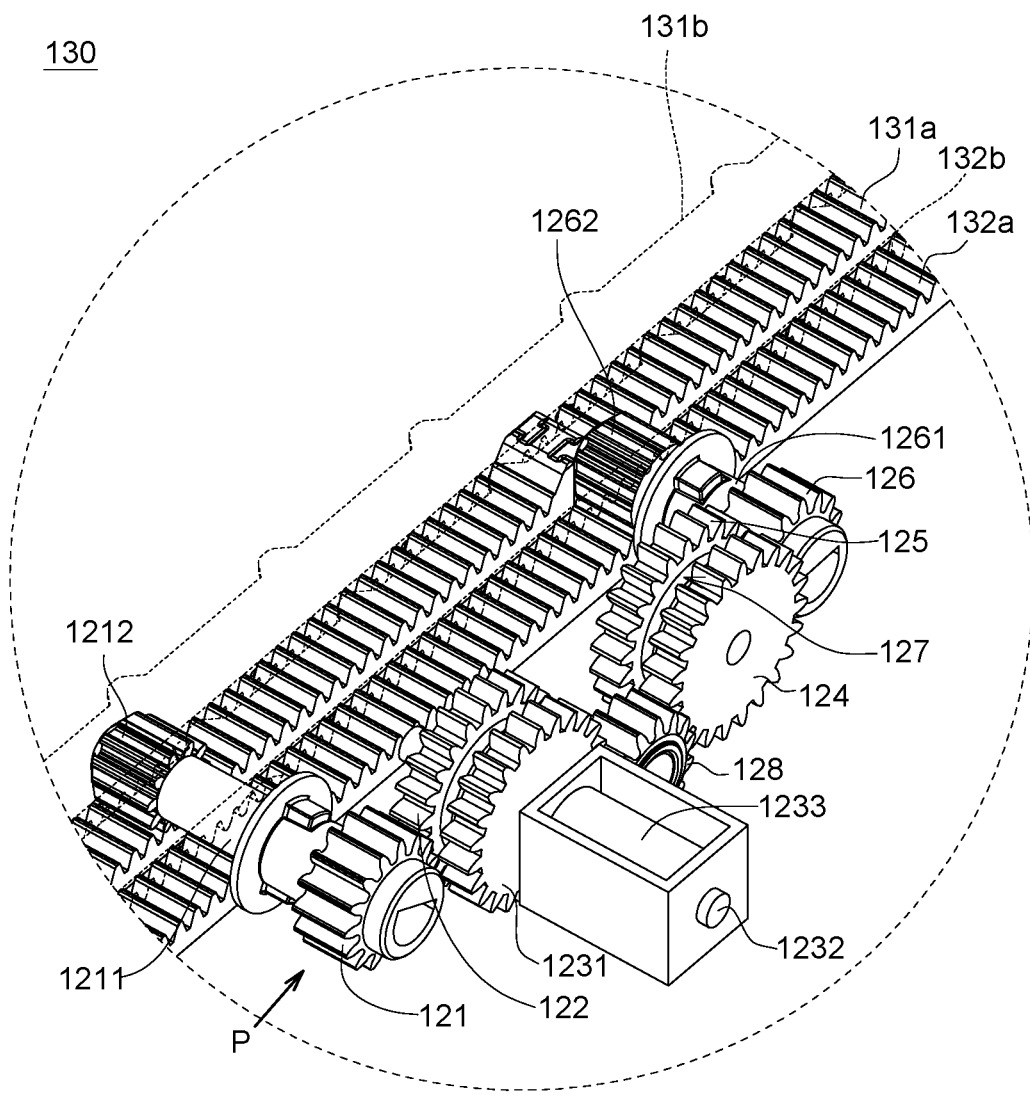
FIG. 2B is a schematic diagram of a blade driving system according to an embodiment of the invention.
Figure 2C:
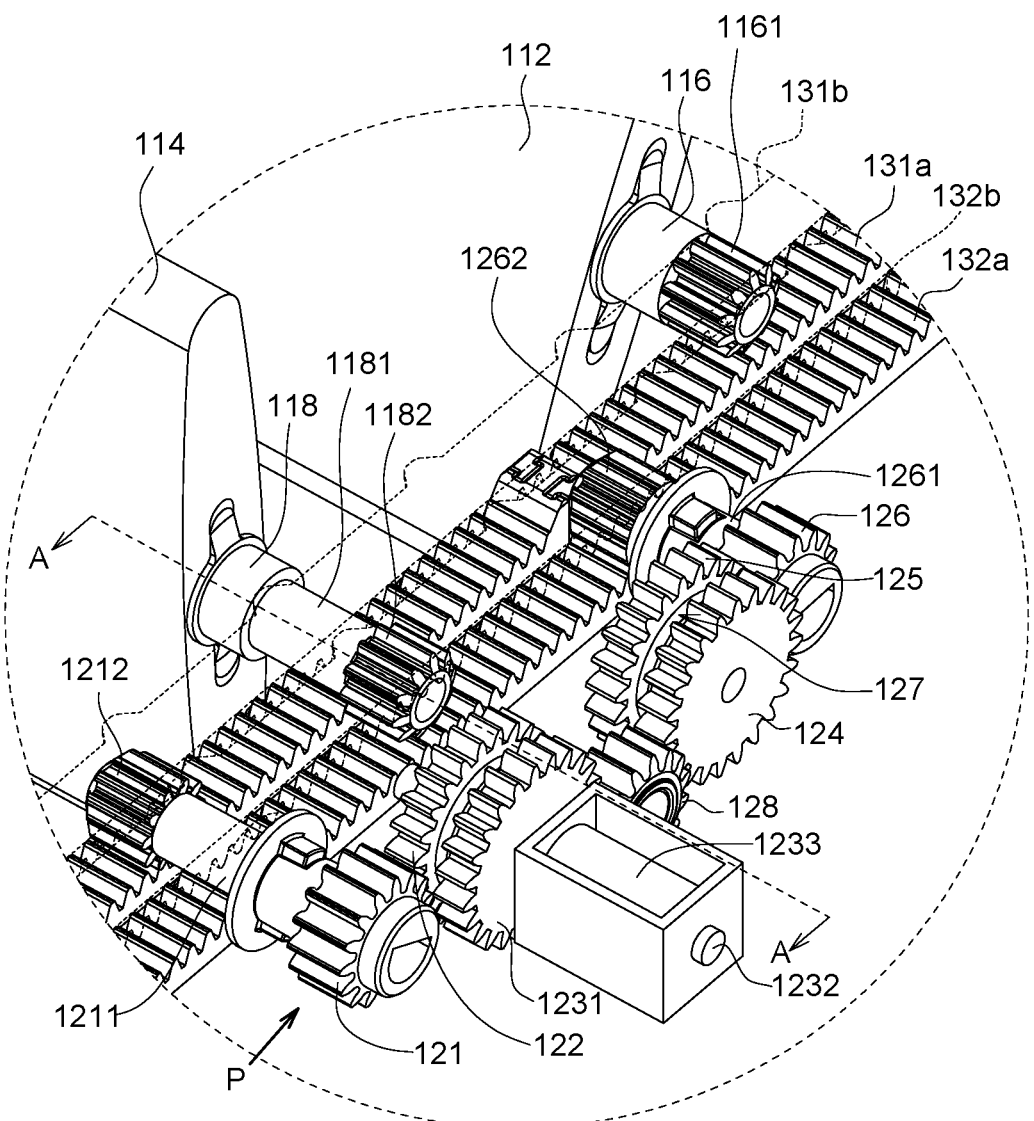
FIG. 2C is a schematic diagram of a blade driving system used in a shutter according to an embodiment of the invention.

Refer to FIGS. 2A-2C. FIG. 2A is a schematic diagram of a transmission device 120 according to an embodiment of the invention. FIG. 2B is a schematic diagram of a blade driving system 130 according to an embodiment of the invention. FIG. 2C is a schematic diagram of a blade driving system 130 used in a shutter 100 according to an embodiment of the invention.

As indicated in FIGS. 2A-2C, the transmission device 120 includes a first gear 121, a second gear 122, a clutch 123, a fourth gear 124, a fifth gear 125, a friction plate 127 and a sixth gear 126. The clutch 123 has a third gear 1231. In an embodiment, the first gear 121 is located at one end of the shaft 1211 (referring to FIG. 2B), the other end of the shaft 1211 is interposed between the two racks 131a and 131b of the first rack 131 and has another latch 1212 (referring to FIG. 2B) engaged with the two racks 131a and 131b, such that after the first gear 121 receives a power P from the power source 115, the first gear 121 can transmit the power P to the first rack 131 via the shaft 1211 and the latch 1212 for directly driving the first rack 131 to move.

The second gear 122 and the first gear 121 are engaged with each other. The second gear 122 and the third gear 1231 of the clutch 123 are adjacent to each other. The two adjacent inner surfaces of the second gear 122 and the third gear 1231 can respectively have the teeth and the notches are engaged with each other. When the teeth and the notches are engaged with each other, the second gear 122 and the third gear 1231 are coupled and rotate simultaneously. When the teeth and the notches are not engaged with each other, the second gear 122 and the third gear 1231 are separated from each other and no more rotate simultaneously. Therefore, through the clutch 123, the first gear 121 can transmit the power P to the third gear 1231 or the second gear 122. Meanwhile, when the first gear 121 transmits the power P to the second gear 122 only, the second gear 122 is in an idle state, and does not transmit any power P out.

In an embodiment, the clutch 123 includes a drive shaft 1232 and a control valve 1233. The third gear 1231 is disposed on the drive shaft 1232. The control valve 1233 is for driving the drive shaft 1232 to control the second gear 122 to be coupled with or separated from the third gear 1231. As indicated in FIG. 2A, the control valve 1233 allows the drive shaft 1232 and the third gear 1231 to move on an axial direction of the drive shaft 1232. When the third gear 1231 is controlled to move to the left, the second gear 122 and the third gear 1231 are coupled with each other. When the third gear 1231 is controlled to move to the right, the third gear 1231 is separated from the second gear 122, such that the transmission of the power P can be switched. In an embodiment, the control valve 1233 can be realized by an electromagnetic valve or other type of valve. When the electromagnetic valve is electrified, the drive shaft 1232 can be moved by an electromagnetic force, such that the second gear 122 and the third gear 1231 can be coupled with or separated from each other.

Refer to FIGS. 2A-2C. The fourth gear 124 and the third gear 1231 can be engaged with each other through a gear 128, or, the fourth gear 124 and the third gear 1231 can be coupled by other transmission element, and the present invention does not have specific restrictions regarding the said arrangement. Moreover, the fifth gear 125 and the fourth gear 124 are adjacent to each other, That is, the two adjacent inner surfaces of the fifth gear 125 and the fourth gear 124 are adjacent to each other. The friction plate 127 can be interposed between the fourth gear 124 and the fifth gear 125. That is, the friction plate 127 can be disposed on the inner surface of the fourth gear 124 or the inner surface of the fifth gear 125. When only one friction plate 127 is disposed on the inner surface of one of the gears, the inner surface of the other gear can be a coarse surface, such that friction can be generated between the two gears. Or, the inner surface of the fourth gear 124 and the inner surface of the fifth gear 125 respectively have a friction plate 127 disposed thereon, and the two friction plates 127 are coupled with each other to generate a friction.

When the resistance is absent or very little, the fourth gear 124 can be coupled with the fifth gear 125 through the friction of the friction plate 127. Furthermore, the sixth gear 126 and the fifth gear 125 are engaged with each other. Therefore, the power P can be transmitted to the sixth gear 126 via the fourth gear 124 and the fifth gear 125. In an embodiment, the sixth gear 126 is located at one end of the shaft 1261 (referring to FIG. 2B), and the other end of the shaft 1261 is interposed between the two racks 132*a* and 132*b* of the second rack 132 and has another latch 1262 (referring to FIG. 2B) engaged with the two racks 132*a* and 132*b*. Therefore, after the sixth gear 126 receives a power P from the power source 115, the power P can be transmitted to the second rack 132 via the shaft 1261 and the latch 1262 for driving the second rack 132 to move.

The condition that the resistance is absent or very little refers to the condition that the rotation resistance of the sixth gear 126 is very little such that the friction plate 127 will not slip between the fourth gear 124 and the fifth gear 125. For example, when the rotation resistance of the sixth gear 126 is smaller than the friction of the friction plate 127, the sixth gear 126 can be driven to rotate. The resistance of the sixth gear 126 comes from the resistance of the second rack 132 and the resistance of the second blade set 114. When the second blade set 114 is blocked by other blade and cannot rotate or the second blade set 114 has reached a critical angle, the rotation resistance of the second blade set 114 will increase. When the rotation resistance of the sixth gear 126 is larger than the friction of the friction plate 127, the sixth gear 126 cannot be driven to rotate, such that the friction plate 127 slips between the fourth gear 124 and the fifth gear 125.

That is, when the friction of the friction plate 127 is larger than the rotation resistance of the sixth gear 126, the friction plate 127 is coupled between the fourth gear 124 and the fifth gear 125. When the friction of the friction plate 127 is smaller than the rotation resistance of the sixth gear 126, the friction plate 127 slips between the fourth gear 124 and the fifth gear 125. The friction of the friction plate 127 can be determined according the coefficient of friction and positive engagement force of the friction plate 127 interposed between the fourth gear 124 and the fifth gear 125.

Figure 3:
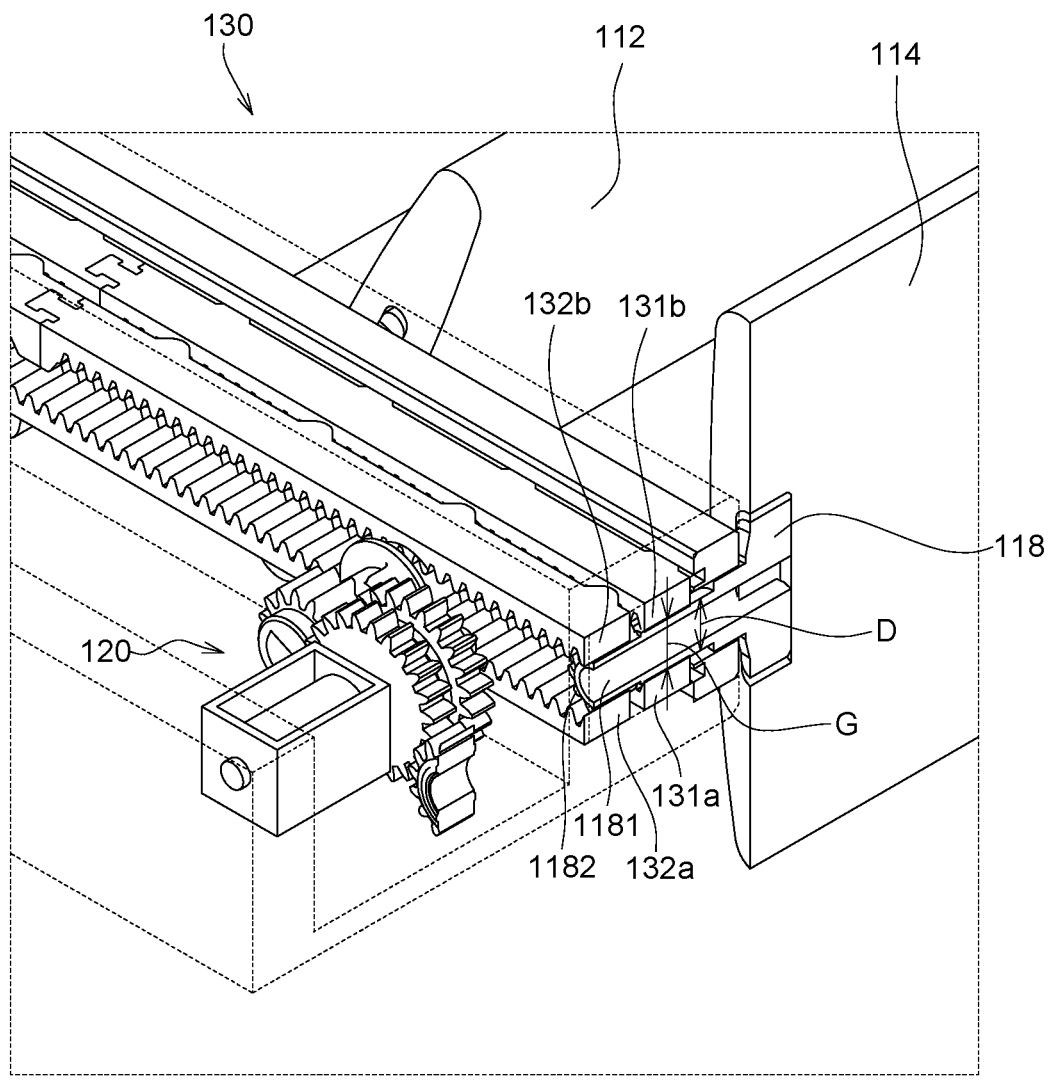
FIG. 3 is a schematic diagram of the blade driving system of FIG. 2C viewed along a cross-sectional line A-A.

FIG. 3 is a schematic diagram of the blade driving system 130 of FIG. 2C viewed along a cross-sectional line A-A. Refer to FIGS. 2C and 3. In an embodiment, the first rack 131 and the second rack 132 are arranged in parallel, and the second rack 132 is farther away from the second blade set 114 than the first rack 131. For the second blade set 114 and the second rack 132 to be coupled together, each blade of the second blade set 114 includes a second shaft connection portion 118. The second shaft connection portion 118 includes a rod 1181 and a second latch 1182 disposed on the rod 1181. The dimension D of the rod 1181 is smaller than the gap G between the two racks 131*a* and 131*b* of the first rack 131, such that the rod 1181 can pass through the first rack 131. Moreover, the second latch 1182 is located at one end of the rod 1181 passing through the first rack 131, and the pitch diameter of the second latch 1182 is larger than the dimension D of the rod 1181 and substantially equivalent to the gap G between the two racks 132*a* and 132*b* of the second rack 132, such that the second latch 1182 can be engaged between the two racks 132*a* and 132*b* of the second rack 132.

The above disclosure shows that when the third gear 1231 is coupled with the second gear 122, the power P can be transmitted via the first gear 121 to drive the first blade set 112 to rotate; meanwhile, the power P can further be transmitted to the sixth gear 126 via the fourth gear 124 engaged with the third gear 1231 as well as the fifth gear 125 coupled with the fourth gear 124 through friction, such that the sixth gear 126 can drive the second blade set 114 to rotate. Thus, the first blade set 112 and the second blade set 114 can rotate simultaneously. As disclosed in above embodiments, the user can select to drive the first blade set 112 only or drive the first blade set 112 and the second blade set 114 simultaneously.

Figure 4:
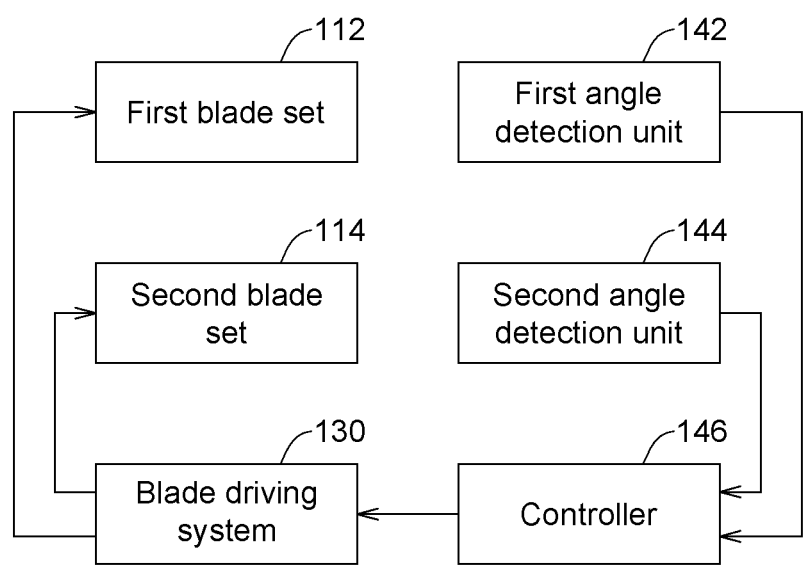
FIG. 4 is a block diagram of a control system of a shutter according to an embodiment of the invention.

Referring to FIG. 4, a block diagram of a control system 101 of a shutter 100 according to an embodiment of the invention is shown. In an embodiment, to control the rotation angles of the first blade set 112 and the second blade set 114, the shutter 100 further includes a first angle detection unit 142, a second angle detection unit 144 and a controller 146. The first angle detection unit 142 is for detecting an angle of the first blade set 112. The second angle detection unit 144 is for detecting an angle of the second blade set 114. The controller 146 is for determining the rotation angles of the first blade set 112 and the second blade set 114. The first angle detection unit 142 and the second angle detection unit 144 can be realized by such as angle encoders or optical sensors.

In an embodiment, the user can control the first blade set 112 and the second blade set 114 using a user-defined operation mode or an in-built operation mode of the controller 146 for rotating and fixing the blades to a predetermined position or a predetermined angle. For example, the controller 146 can control the blade driving system 130 to rotate the blades to a horizontal position, a vertical position or an inclined angle to ventilate the air, adjust light shading and light transmittance, and prevent the infiltration of heavy rain and strong winds and insects.

Besides, the blades of the shutter 100 can further have at least one solar panel (not illustrated) disposed thereon. For example, the at least one solar panel is disposed on one or both of the first blade set 112 and the second blade set 114. In an embodiment, when the solar panel on the first blade set 112 is disposed towards the sunlight, to avoid the second blade set 114 blocking the light, the second blade set 114 can be suitably rotated for allowing the sunlight to be irradiated on the solar panel to increase the illuminated area of the solar panel.

In another embodiment, the first blade set 112 and the second blade set 114 can form a V-shaped opening facing the outdoors. When hot air enters the indoors via the V-shaped opening, the volume of hot air is compressed, the temperature is increased and hot energy is released to the outdoors. Therefore, the temperature of the air entering the indoors will be lowered, and the indoors will be ventilated and cooled down.

It should be noted that the first blade set 112 can be independently driven to rotate to a target angle. However, when the rotation angle of the first blade set 112 is blocked by the second blade set 114 and cannot be increased any more (for example, the rotation angle has reached the critical angle), the blade driving system 130 can simultaneously drive the first blade set 112 and the second blade set 114 to increase the rotation angle of the first blade set 112. Or, when the rotation angle of the second blade set 114 is blocked by the first blade set 112 and cannot reach the target angle, the blade driving system 130 can independently drive the first blade set 112 to inversely rotate to an angle until the second blade set 114 is no more blocked by the first blade set 112. Then, the blade driving system 130 can simultaneously drive the first blade set 112 and the second blade set 114 to rotate to increase the rotation angle of the second blade set 114. Detailed descriptions of the blade angle control method used in the shutter 100 are disclosed below with accompanying drawings.

Figure 5:
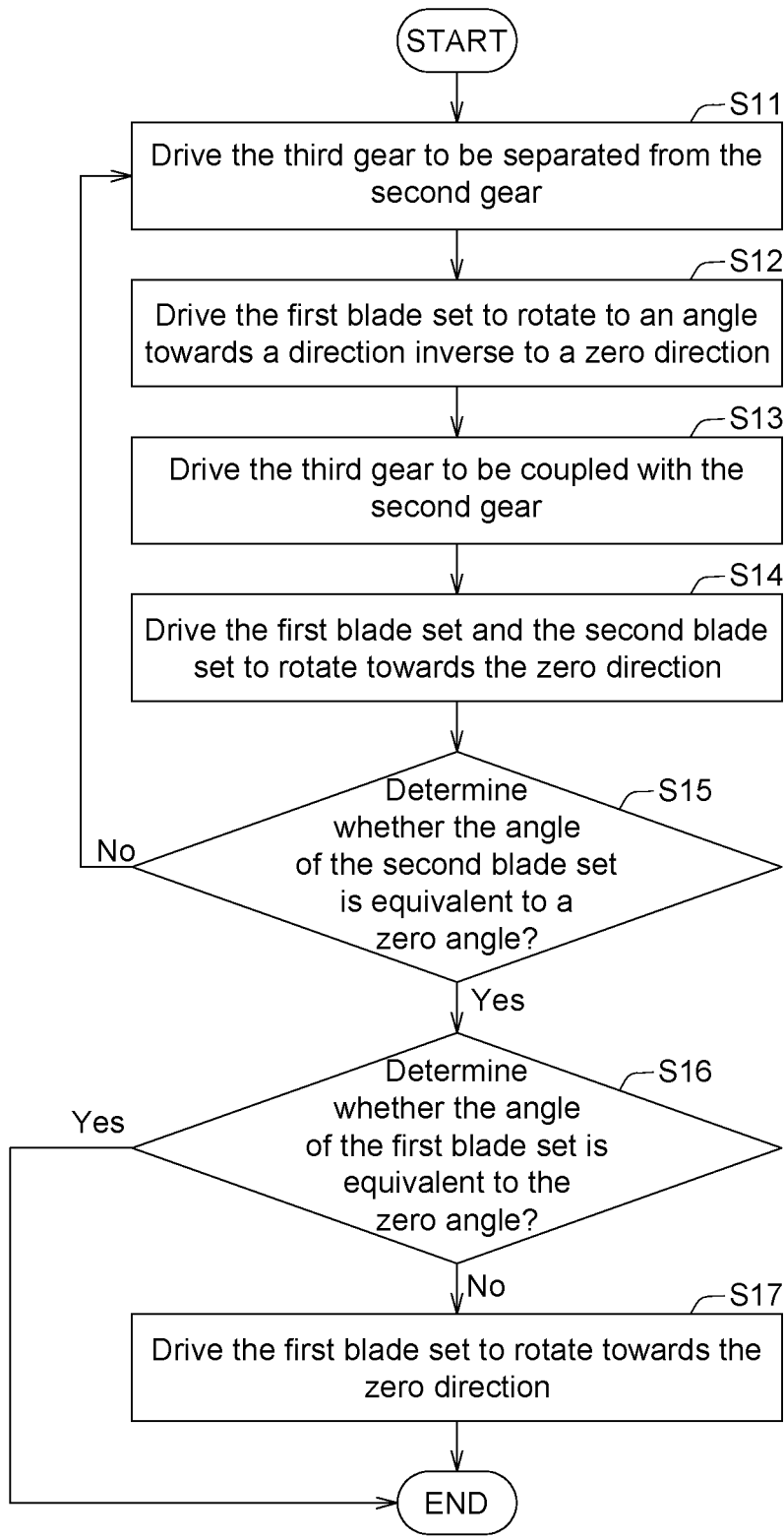
FIG. 5 is a flowchart of a blade angle control method used in a shutter according to an embodiment of the invention.

Refer to FIGS. 2C, 4 and 5. FIG. 5 is a flowchart of a blade angle control method 102 of a shutter 100 according to of the invention another embodiment. The blade angle control method 102 returns the angles of the first blade set 112 and the second blade set 114 to zero. The blade angle control method 102 includes steps S11-S17. Firstly, the method begins at step S11, when the angle of the second blade set 114 is not equivalent to a zero angle, the third gear 1231 is driven to be separated from the second gear 122, such that the power P cannot be transmitted to the third gear 1231 via the second gear 122.

Then, in the step S12, the first blade set 112 is driven to rotate to an angle towards a direction inverse to the zero direction. That is, the first blade set 112 is firstly rotated towards the direction inverse to the zero direction, such that the second blade set 114 will not be blocked by the first blade set 112 and will rotate towards the zero direction.

Then, the method proceeds to step S13, the third gear 1231 is driven to be coupled with the second gear 122, such that power P can simultaneously drive the first blade set 112 and the second blade set 114. Then, the method proceeds to step S14, the first blade set 112 and the second blade set 114 are driven to rotate towards the zero direction until the angle of the second blade set 114 is equivalent to the zero angle. That is, when the first blade set 112 continuously rotates, the angle detected by the second angle detection unit 144 no more changes. This means that the second blade set has reached the zero angle. The rotation angle of the second blade set 114 can be obtained from the rotation angle of the sixth gear 126 detected by the second angle detection unit 144.

Then, the method proceeds to step S15, whether the angle of the second blade set 114 is equivalent to the zero angle is determined. When the angle of the second blade set 114 is equivalent to the zero angle, the method proceeds to step S16, whether the angle of the first blade set 112 is equivalent to the zero angle is determined. When the angle of the first blade set 112 is not equivalent to the zero angle, the method proceeds to step S17, the first blade set 112 is continuously driven to rotate towards the zero direction until the angle of the first blade set 112 is equivalent to the zero angle. That is, when the first blade set 112 continues to rotate towards the zero direction, the first angle detection unit 142 does not detect any signal changes within a specific time. This means that the first blade set 142 has reached the zero angle. The rotation angle of the first blade set 112 can be obtained from the rotation angle of the first gear 121 detected by the first angle detection unit 142.

In step S15, when the angle of the second blade set 114 is not equivalent to the zero angle, the method returns to step S11, and steps S12 to S14 are repeated until the angle of the second blade set 114 is equivalent to the zero angle.

To achieve the above requirement, the rotation resistance of the sixth gear 126 and the friction of the friction plate 127 need special design. That is, when the angle of the second blade set 114 is equivalent to the zero angle, the rotation resistance of the second blade set 114 needs to be larger than the friction of the friction plate 127, such that the friction plate 127 slips between the fourth gear 124 and the fifth gear 125; meanwhile, the second blade set 114 rotates no more and stops at the zero angle. That is, when the angle of the second blade set 114 is not equivalent to the zero angle, the rotation resistance of the sixth gear 126 needs to be smaller than the friction of the friction plate 127, such that the friction plate 127 is coupled between the fourth gear 124 and the fifth gear 125. Conversely, when the angle of the second blade set 114 is equivalent to the zero angle, the rotation resistance of the sixth gear 126 needs to be larger than the friction of the friction plate 127, such that the friction plate 127 slips between the fourth gear 124 and the fifth gear 125.

Figure 6:
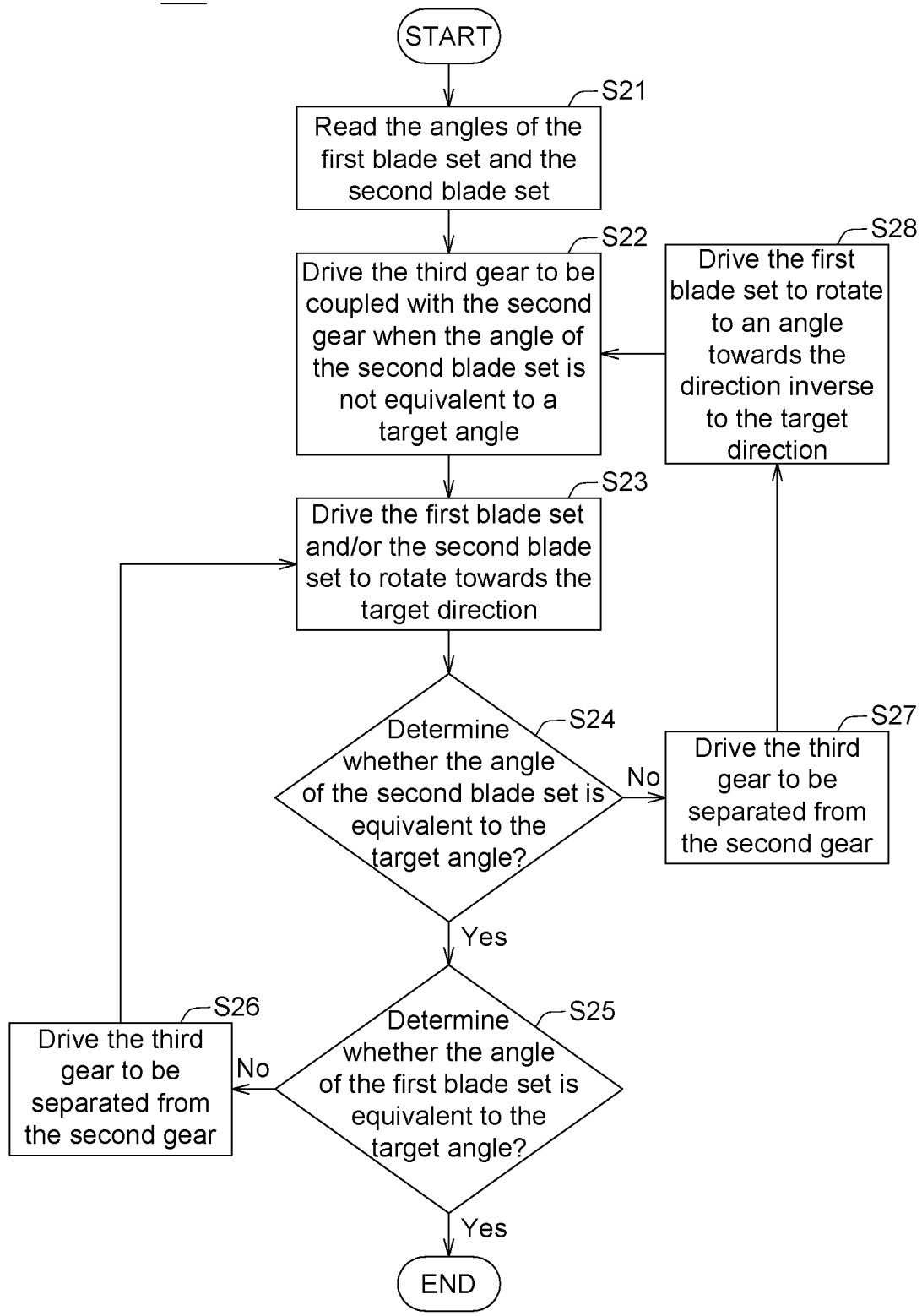
FIG. 6 is a flowchart of a blade angle control method used in a shutter according to of the invention another embodiment.

Refer to FIGS. 4 and 6. FIG. 6 is a flowchart of a blade angle control method 103 of a shutter 100 according to of the invention another embodiment. The blade angle control method 103 makes the angles of the first blade set 112 and the second blade set 114 reach a target angle. The angle control method 103 includes steps S21-S28. Firstly, the method begins at step S21, the angles of the first blade set 112 and the second blade set 114 are read. For example, the angles of the first blade set 112 and the second blade set 114 are calculated from the measurement values detected by the first angle detection unit 142 and the second angle detection unit 144. Under the condition that the first angle detection unit 142 and the second angle detection unit 144 can enter a power mode from a sleep mode, a return-to-zero action must be taken beforehand. The angle of each blade set can be obtained from the change of angle detected in the return-to-zero action. Under the condition that the first angle detection unit 142 and the second angle detection unit 144a remain at the power mode, the angle can be read directly. Then, In the step S22, when the angle of the second blade set 114 is not equivalent to a target angle, the third gear 1231 is driven to be coupled with the second gear 122. Then, the method proceeds to step S23, the first blade set 112 and the second blade set 114 are driven to rotate towards the target direction.

Then, the method proceeds to step S24, whether the angle of the second blade set 114 is equivalent to the target angle is determined. When the angle of the second blade set 114 is equivalent to the target angle, the method proceeds to step S25, whether the angle of the first blade set 112 is equivalent to the target angle is determined. When the angle of the first blade set 112 is equivalent to the target angle, then the method terminates. When the angle of the first blade set 112 is not equivalent to the target angle, then the method proceeds to step S26, the third gear 1231 is driven to be separated from the second gear 122. Then, the method returns to step S23, the first blade set 112 is driven to rotate towards the target direction until the angle of the first blade set 112 is equivalent to the target angle.

In step S24, when the angle of the second blade set 114 is not equivalent to the target angle, whether the angle of the first blade set 112 is equivalent to a critical angle is determined. That is, when the first blade set 112 is blocked by the second blade set 114 and no more rotates, the angle of the first blade set 112 is equivalent to the critical angle. When the angle of the first blade set 112 is equivalent to the critical angle, the method proceeds to step S27, the third gear 1231 is driven to be separated from the second gear 122. Then, the method proceeds to step S28, the first blade set 112 is driven to rotate to an angle towards the direction inverse to the target direction. Then, the method returns to step S22, and steps S23 and S24 are repeated. In step S28, when the first blade set 112 is driven to rotate towards the direction inverse to the target direction, the first blade set 112 will not be blocked by the second blade set 114 to rotate. Steps S27 and S28 can be repeated more than once, and can be repeated until the angle of the second blade set 114 in step S24 is equivalent to the target angle.

According to the shutter and the blade angle control method used therein disclosed in above embodiments of the invention, the power can be transmitted to different blade sets using a clutch or other transmission device, such that different blade sets can be opened to different angles. The number of blade sets is not limited to two. When more than two blade sets are used, two sets of transmission devices can be switched by two sets of clutches, such that the purpose of opening multiple blade sets to different angles can be achieved.

While the invention has been described by example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A shutter, comprising:
    a frame having a frame body;
    a first blade set and a second blade set both disposed on the frame body of the frame;
    a power source disposed in the frame body; and
    a blade driving system comprising a first rack, a second rack and a transmission device disposed in the frame body, wherein the first rack is connected to the first blade set, the second rack is connected to the second blade set, and the transmission device is connected to the first rack and the second rack for driving the first rack and/or the second rack, a first part of the transmission device is connected to the power source and the first blade set for rotating the first blade set independent of the second blade set, and a second part of the transmission device is connected to the power source, the first blade set and the second blade set for rotating the first blade set and the second blade set.

2. The shutter according to claim 1, wherein the first part of the transmission device comprises:
    a first gear connected to the power source; and
    wherein the second part of the transmission device comprises:
    a second gear engaged with the first gear;
    a clutch comprising a third gear disposed adjacent to the second gear, wherein when the second gear is coupled with the third gear, a power is transmitted to the third gear via the second gear;
    a fourth gear engaged with the third gear;
    a fifth gear disposed adjacent to the fourth gear;
    a friction plate coupled or slipped between the fourth gear and the fifth gear; and
    a sixth gear engaged with the fifth gear;
    wherein the first gear and the first rack are connected, and the sixth gear and the second rack are connected.

3. The shutter according to claim 2, wherein the clutch further comprises a drive shaft and a control valve, the third gear is disposed on the drive shaft, and the control valve is for driving the drive shaft to control the second gear to be coupled with or separated from the third gear.

4. The shutter according to claim 3, wherein the control valve is an electromagnetic valve.

5. The shutter according to claim 4, wherein when a rotation resistance of the sixth gear is smaller than a friction of the friction plate, the friction plate is coupled between the fourth gear and the fifth gear, when the rotation resistance of the sixth gear is larger than the friction of the friction plate, the friction plate slips between the fourth gear and the fifth gear.

6. The shutter according to claim 1, further comprising:
    a first angle detection unit for detecting an angle of the first blade set;
    a second angle detection unit for detecting an angle of the second blade set; and
    a controller for determining rotation angles of the first blade set and the second blade set.

7. The shutter according to claim 1, wherein the first blade set and the second blade set are arranged in a staggered manner.

8. The shutter according to claim 1, further comprising at least a solar panel disposed on one or both of the first blade set and the second blade set.

9. A blade angle control method used in the shutter according to claim 1, comprising:
    rotating the first blade set towards a direction inverse to a first direction when the second blade set does not reach a first angle;
    rotating the first blade set and the second blade set towards the first direction;
    determining whether the second blade set reach the first angle; and
    rotating the first blade set towards the first direction when the second blade set reaches the first angle.

10. A blade angle control method used in the shutter according to claim 1, comprising:
    reading angles of the first blade set and the second blade set;
    rotating the first blade set and the second blade set towards a first direction;
    determining whether the angle of the first blade set is equivalent to a first angle when the second blade set reaches the first angle; and
    rotating the first blade set towards the first direction when the angle of the first blade set is not equivalent to the first angle.

11. The blade angle control method according to claim 10, wherein when the angle of the second blade set is not equivalent to the first angle, the method further comprises:
    detecting whether the angle of the first blade set is equivalent to a critical angle when the first blade set is blocked by the second blade set at a position in the critical angle, and rotating the first blade set towards a direction inverse to the first direction when the angle of the first blade set is equivalent to the critical angle.

* * * * *